US009273961B2

(12) United States Patent
Kim

(10) Patent No.: US 9,273,961 B2
(45) Date of Patent: Mar. 1, 2016

(54) DYNAMICALLY BALANCED FLYWHEEL

(71) Applicant: Lit Motors Corporation, San Francisco, CA (US)

(72) Inventor: Daniel Kee Young Kim, Vancouver, WA (US)

(73) Assignee: Lit Motors Corporation, San Francisco, CA (US)

(*) Notice: Subject to any disclaimer, the term of this patent is extended or adjusted under 35 U.S.C. 154(b) by 269 days.

(21) Appl. No.: 13/777,919

(22) Filed: Feb. 26, 2013

(65) Prior Publication Data

US 2013/0233100 A1   Sep. 12, 2013

Related U.S. Application Data

(60) Provisional application No. 61/603,885, filed on Feb. 27, 2012, provisional application No. 61/603,886, filed on Feb. 27, 2012.

(51) Int. Cl.
*A63G 25/00* (2006.01)
*G01C 19/06* (2006.01)
*F16F 15/315* (2006.01)

(52) U.S. Cl.
CPC .............. *G01C 19/06* (2013.01); *F16F 15/315* (2013.01); *Y10T 74/1296* (2015.01)

(58) Field of Classification Search
CPC ............................ A63G 25/00; B60L 2200/26
USPC ....................................... 180/2.1, 65.1–65.31
See application file for complete search history.

(56) References Cited

U.S. PATENT DOCUMENTS

| 3,749,194 | A | * | 7/1973 | Bardwick, III | 180/165 |
| 5,427,194 | A | * | 6/1995 | Miller | 180/165 |
| 2008/0047375 | A1 | | 2/2008 | Sonoura | |
| 2008/0288710 | A1 | | 11/2008 | Maeda et al. | |
| 2009/0124168 | A1 | * | 5/2009 | Berera et al. | 446/456 |
| 2011/0016996 | A1 | * | 1/2011 | Suda et al. | 74/5.1 |

(Continued)

FOREIGN PATENT DOCUMENTS

| JP | H05141976 | 6/1993 |
| WO | WO-2008/003381 | 1/2008 |
| WO | WO-2009/019670 | 2/2009 |

OTHER PUBLICATIONS

International Search Report and Written Opinion for International Application No. PCT/US2013/028083, mailed Jul. 4, 2013, 9 pages.

(Continued)

*Primary Examiner* — John Walters
*Assistant Examiner* — James Triggs
(74) *Attorney, Agent, or Firm* — Blakely Sokoloff Taylor & Zafman LLP

(57) ABSTRACT

In embodiments of the invention, a vehicle stabilization control unit may determine a control moment value for one or more gyroscopes coupled to a vehicle frame to exert for stabilization of the vehicle frame. A number of input axes for the flywheels of the one or more gyroscopes to precess may be increased in order to generate the determined control moment value. In some embodiments, the one or more gyroscopes are further coupled to a turntable, and increasing the number of input axes for the flywheels comprises rotating the turntable. Furthermore, in some embodiments, the one or more gyroscopes comprise at least two gyroscopes coupled inline to the vehicle frame (e.g., aligned lengthwise with respect to the front and rear wheel to spin and precess in opposite directions with respect to each other).

16 Claims, 13 Drawing Sheets

(56) References Cited

U.S. PATENT DOCUMENTS

2011/0175370 A1\* 7/2011 Dugas .................... 290/1 R
2011/0231041 A1 9/2011 Kim et al.

OTHER PUBLICATIONS

Aviatsiya: Entsiklopediya, Gl. redaktor Svischev G.P., Moskva, Bolshaya Rossiyskaya entsiklopediya, 1994, ISBN 5-85270-086-x, p. 178, 179.

International Preliminary Report on Patentability for International Application No. PCT/US2013/028083, mailed Sep. 12, 2014, 7 pages.

Non-Final Office Action for U.S. Appl. No. 13/777,939, mailed Jun. 8, 2015.

Final Office Action for U.S. Appl. No. 13/777,939, mailed Nov. 24, 2015.

\* cited by examiner

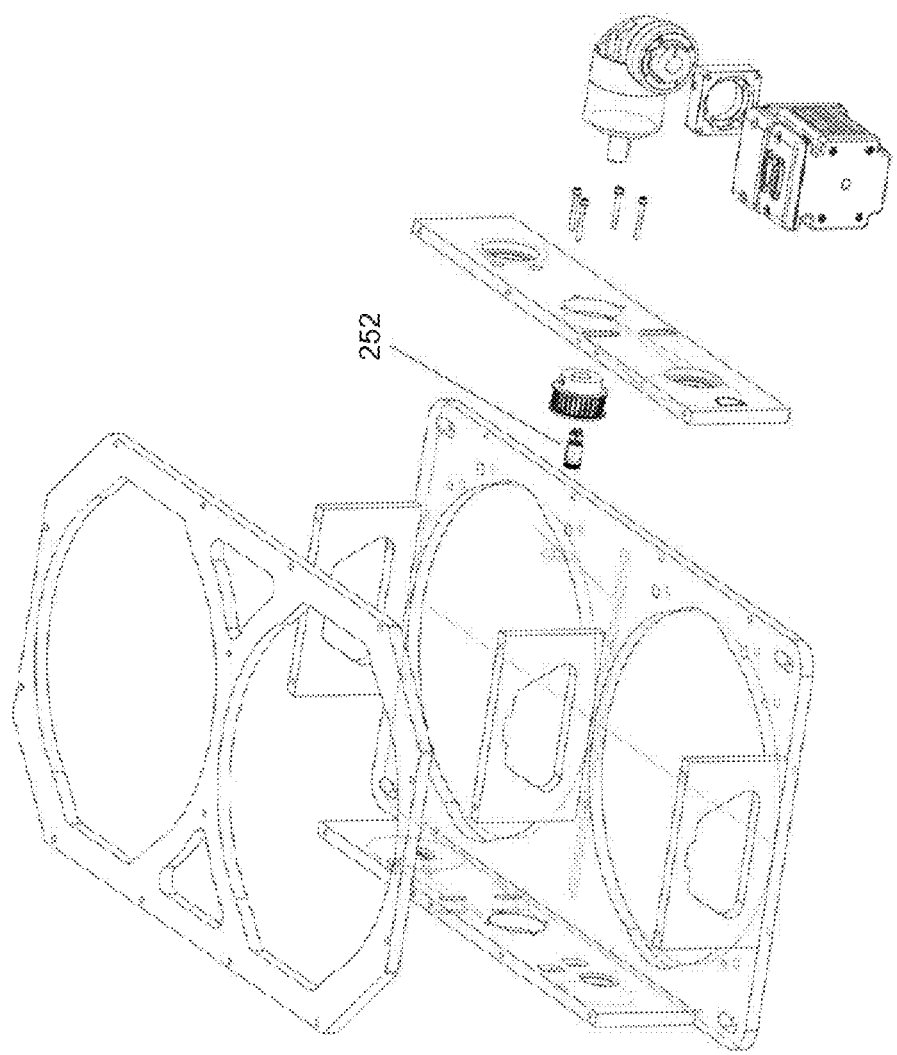

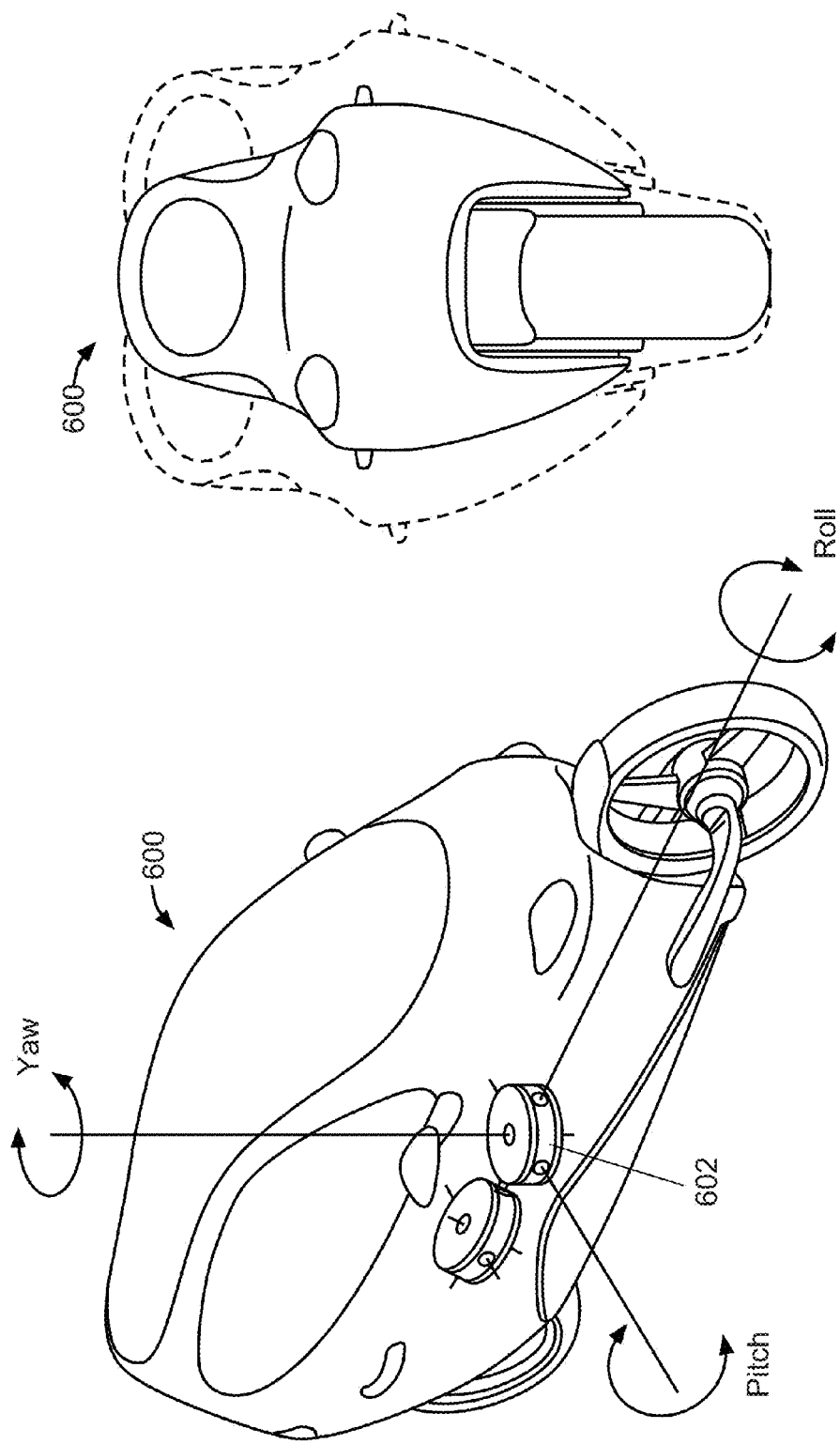

DYNAMICALLY BALANCED FLYWHEEL

CLAIM OF PRIORITY

This application claims priority to Provisional Application No. 61/603,885 filed on Feb. 27, 2012 and to Provisional Application No. 61/603,886 filed on Feb. 27, 2012.

FIELD OF THE INVENTION

Embodiments of the invention generally pertain to transportation vehicles, and more particularly to vehicle stabilization systems.

BACKGROUND

Using a control moment gyroscope (CMG), a torque can be generated within and imparted onto an object (e.g., vehicle body or structure) via an exchange of angular momentum. A CMG may be defined as a way to exchange angular momentum from a flywheel spinning at a given rate, that is converted to torque by pivoting or gimballing the flywheel about an axis transverse to the spinning flywheel, that then is applied to the object of interest via rigid mounting of the CMG system to the structure of the object. The output torque of the CMG typically orients orthogonal to both the flywheel axis and the gimbal axis by gyroscopic precession, and no useful torque is generated if the flywheel of the CMG is orthogonal.

In gyroscopic devices, a flywheel is rotated by a drive shaft to which it is connected by a joint. Gyroscopic torques will tend to cause the flywheel to oscillate with two degrees of freedom about a central position in which the flywheel axis is aligned with the axis of the drive shaft. Imperfections during the manufacturing of the flywheel limit the preciseness of the created torque. In current solutions, in order for a gyroscopic device to generate precise levels of torque, the flywheel must be machined with little if any imperfections, significantly driving the amount of labor and cost to generate such flywheels.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

FIG. 2A and FIG. 2B are illustrations of a multi-axis rotary gyroscope and housing according to an embodiment of the invention.

FIG. 6A-FIG. 6E illustrate a two-wheeled vehicle utilizing a control moment gyroscope unit according to an embodiment of the invention.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.
Description Embodiments of the invention describe methods, apparatuses and systems for utilizing one or more multi-axis rotary gyroscopes, such as a control moment gyroscope (CMG). The number of precession axes for the flywheels of the one or more gyroscopes is increased in order to generate a determined control moment value. Embodiments of the invention allow for attitude control (i.e., pitch, roll and yaw) on two wheeled vehicles.

A gyroscope is a mechanical device used to store energy in a heavy rotating mass. When the energy is extracted as a torque specifically for the purposes of control, the device is referred to as a CMG. Operationally, CMGs are used for attitude control by inputting a torque on one axis to produce a corresponding torque on a perpendicular axis. Embodiments of the invention enable the use of one or more gyroscopes with three degrees of freedom (roll, pitch, and yaw)—e.g., for the attitude control of a two or more wheeled vehicle.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
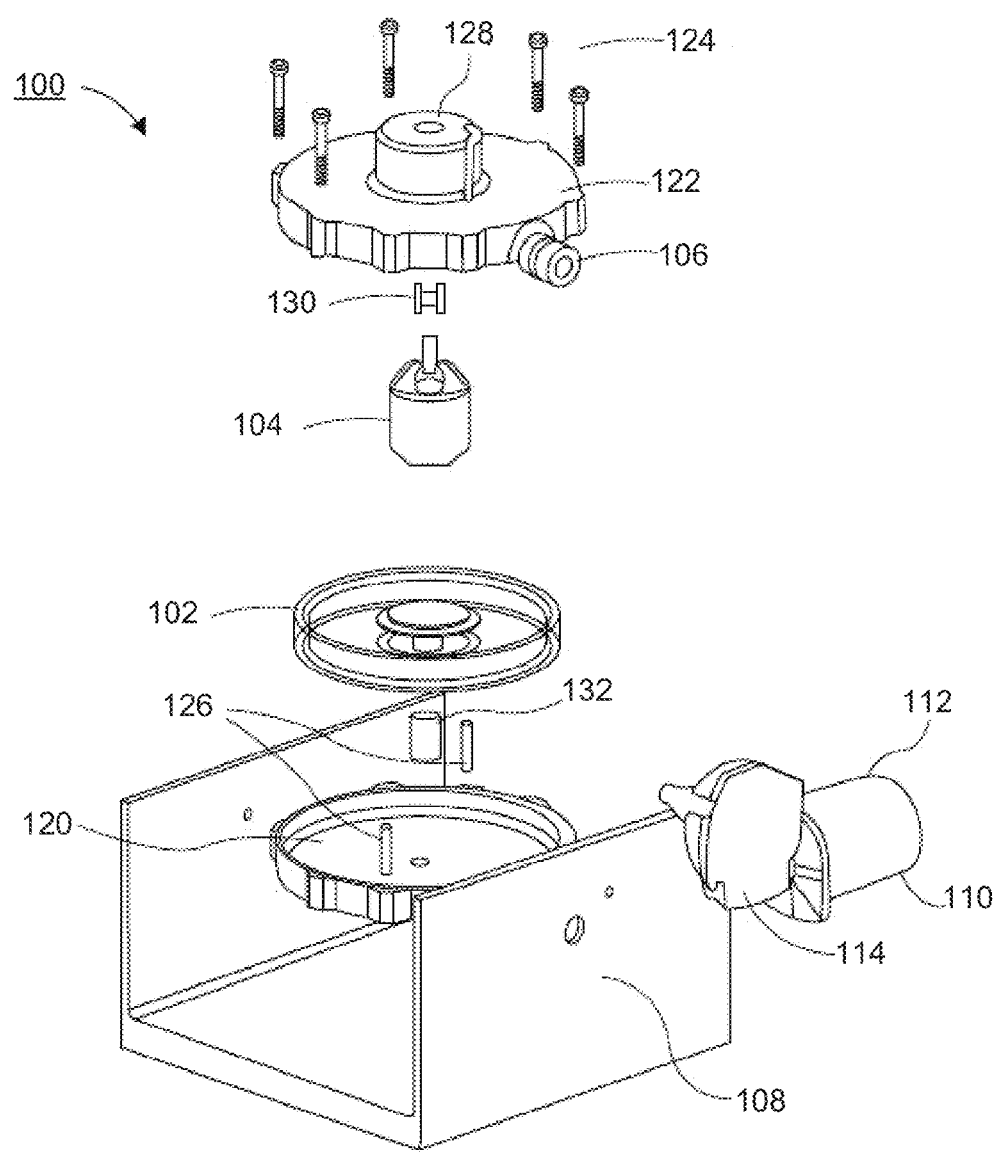
FIG. 1A-FIG. 1B are illustrations of gyroscopic stabilization units according to embodiments of the invention.
Figure 1B:
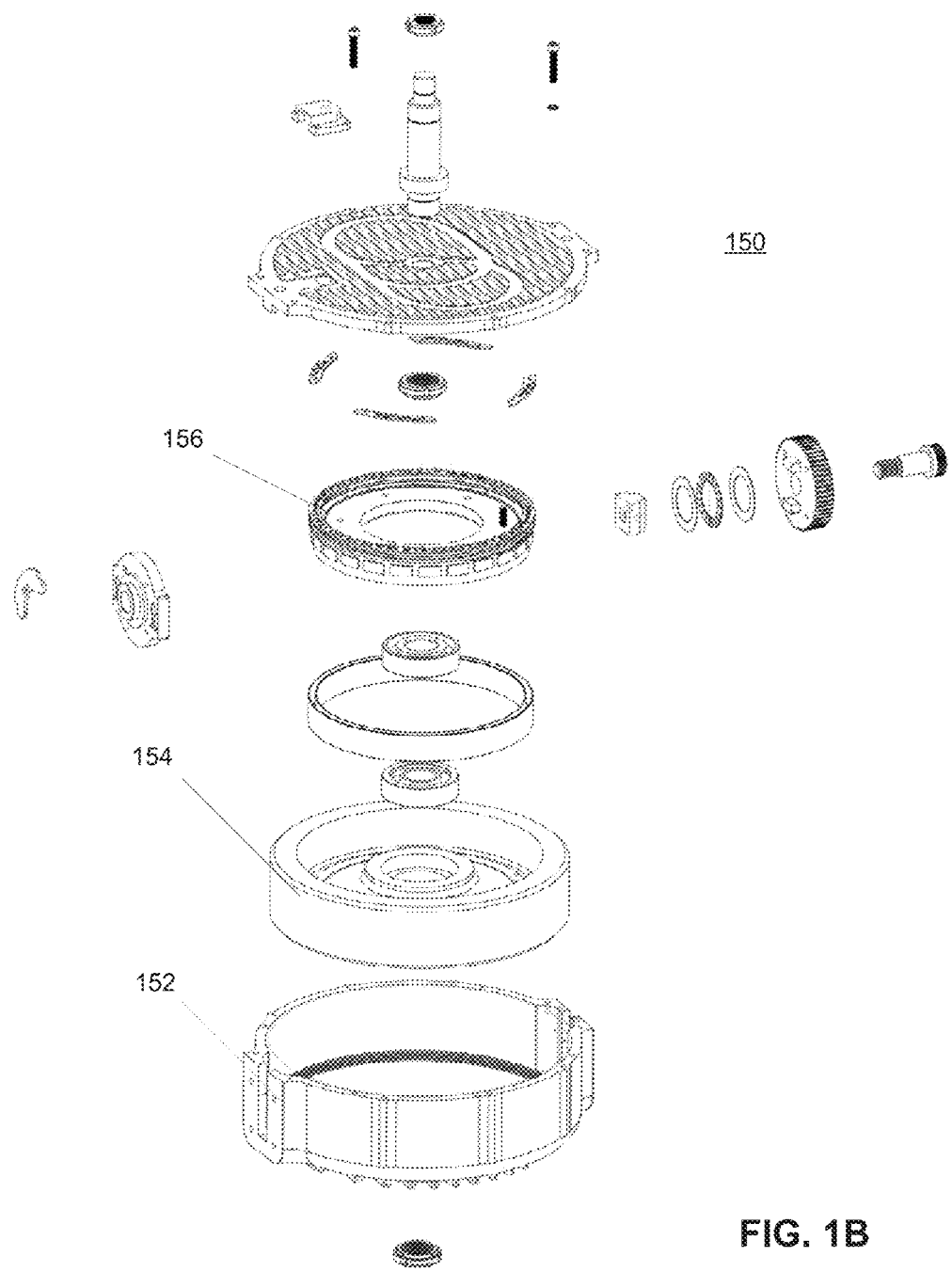

FIG. 1A-FIG. 1B are illustrations of gyroscopic stabilization units according to embodiments of the invention. In embodiments of the invention, vehicles utilize gyroscopic stabilization units to improve vehicle stability during various driving conditions—e.g., at rest, at low speeds, and during a turn.

FIG. 1A illustrates gyro assembly 100 to include flywheel 102, flywheel motor-generator 104 coupled to the flywheel, gimbal 106 coupled to the motor-generator, and precession motor 110 having drive portion 112 (for coupling to gimbal 106) and frame portion 114 (for coupling to the vehicle including the gyro assembly). In this embodiment, precession motor-generator frame portion 114 is coupled to the vehicle through mounting bracket 108, which is fixedly mounted to the vehicle frame.

Flywheel 102 is contained within a gyro housing having bottom portion 120 and top portion 122, which in this embodiment are assembled using threaded fasteners 124 and alignment pins 126. Gyro hosing top portion 122 is shown to include gimbal 106, which provides the precession axis for precessing the gyro assembly to create the counter-torque that may maintain stability for vehicle 100, as well as bearing housing 128 to support flywheel 102. Motor-generator mount bolts 130 and flywheel mount bolts 132 are provided to couple flywheel motor-generator 104, flywheel 102 and the gyro housing. In this embodiment, flywheel 102 and flywheel motor-generator 104 are both contained within gyro upper and lower housing portions 120 and 122, for ease of maintenance and protection. Gyro stabilizer 100 may theoretically be located anywhere on the vehicle so long is it can be coupled to the vehicle frame in order to transmit the counter-torque of a precession motor (e.g., motor 110) to the vehicle frame. For example, gyro stabilizer 100 may be located approximately at the anticipated vertical and fore-aft center of gravity ("CG") of the vehicle at standard conditions.

FIG. 1B illustrates gyro assembly 150 to include flywheel 152, flywheel housing 154, and flywheel motor 156. As described below, in embodiments of the invention, vehicle stabilization control circuitry (or alternatively, logic, modules, or any combination of these means) may determine a control moment value for one or more gyroscopes coupled to a vehicle frame to exert for stabilization of the vehicle frame. A number of input axes for the flywheels of the one or more gyroscopes to precess may be adjusted (e.g., increased) in order to generate the determined control moment value.

Figure 2A:
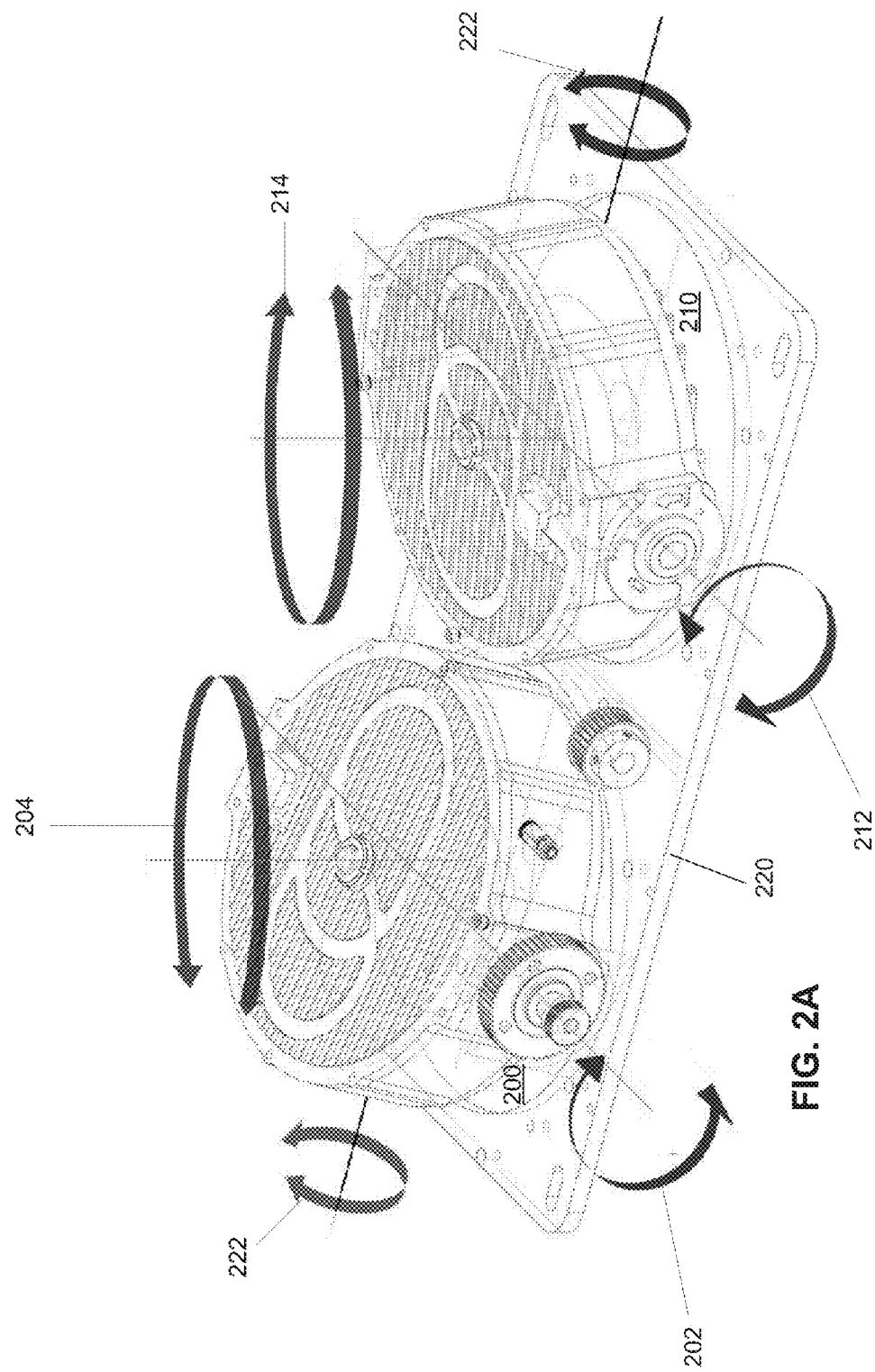

FIG. 2A-FIG. 2B is an illustration of a multi-axis rotary gyroscope according to an embodiment of the invention. In this embodiment, gyroscopes 200 and 210 are shown to have precessing axes 202 and 212, respectively. In the event any of the flywheels of said gyroscopes are normal to the surface (i.e., orthogonal), they are no longer generating useful torque. In other words, during a vehicle stabilization process, said flywheel(s) moves its precession axis, so it changes over time—if it has to precess too much, it may not produce useful torque.

Embodiments of the invention increase the number of input axes to generate a given control movement by rotating the spinning axis of gyroscopes 200 and 210, shown as axis 204 and axis 214, respectively. Therefore, three degrees of freedom are provided when gyroscopes 200 and 210 are utilized on two-wheeled vehicles.

By utilizing more than one axis of control over each gyro's flywheel, additional levels of control of the vehicle's orientation may be achieved. One controlled degree of freedom, when lined up in a mutual orthogonal axis to the vehicles roll axis and the flywheel's rotation axis, may control the vehicle's roll. An additional degree of freedom allows for control over another axis of rotation.

In this embodiment, gyroscopes 200 and 210 are further coupled to turntable 220, and increasing the number of input axes for the flywheels further comprises rotating the turntable. For example, gyroscopes 200 and 210 may comprise gyroscopes coupled inline to the vehicle frame (e.g., aligned lengthwise with respect to the front and rear wheel to spin and to precess in opposite directions with respect to each other). Turntable 220 may change the alignment of these gyroscopes, to move their alignments towards being aligned widthwise with respect to the frame of the vehicle, heightwise with respect to the frame of the vehicle, etc. As shown in FIG. 2B, said gyroscope assemblies and turntable may be included in CMG housing 250. As shown in this figure, said housing may further include position/velocity sensor(s) 252 used to control the position, velocity, or torque input or output of the CMG as described below.

Allowing a vehicle stabilization unit an additional controlled degree of freedom around an axis parallel to the flywheel's rotation axis (shown as axis 222 in FIG. 2A) may allow for additional control over the vehicle's tilt in fringe cases where the flywheel is already orthogonal. A controlled degree of freedom about the roll axis with the flywheel in a vertical orientation may also allow for control over the vehicle's pitch. This would allow for control over the level of traction available at the front and rear wheels of the vehicle. This is especially useful in situations where one wheel has lost traction—gyro system of FIG. 2 is able to shift weight over that wheel to help it regain traction. Also, embodiments of the invention allow for re-balancing the vehicle when braking in order to maintain equal weight distribution to maximize braking ability.

Figure 3:
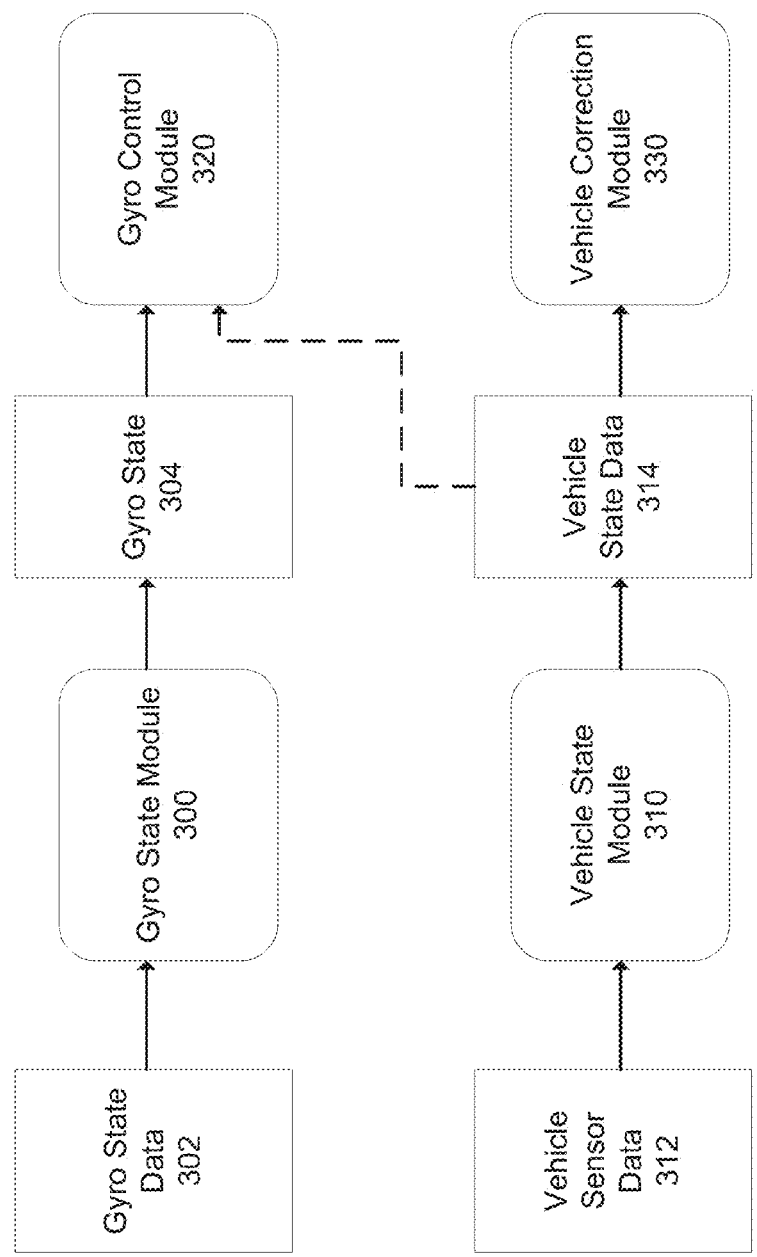
FIG. 3 is an illustration of a control system for controlling one or more multi-axis rotary gyroscopes according to an embodiment of the invention.

FIG. 3 is an illustration of a control system for controlling one or more multi-axis rotary gyroscopes according to an embodiment of the invention. As illustrated in FIG. 3, system modules may receive information from vehicle sensors to determine various states of the vehicle and its components. In this example, FIG. 3 illustrates gyro state module 300 for determining the state of the vehicle's gyros, vehicle state module 310 for determining the state of the vehicle, gyro control module 320 for controlling the vehicle's gyros, and vehicle correction module 330 for controlling other aspects of the vehicle. Although shown as separate modules for illustrative purposes, it is to be understood that modules 300, 310, 320 and 330 may actually comprise a fewer or a greater number of modules, and that in lieu of modules, embodiments of the invention may comprise circuitry, logic or any combination of these means.

Gyro state module 300 is shown to receive sensor data 302 from the sensors of the vehicle's gyroscopes—e.g., data from flywheel sensors coupled to each flywheel of the vehicle. Said flywheel sensors produce signals indicating important measurements including flywheel tilt angle relative to the vehicle frame, flywheel tilt velocity (i.e. the rotational velocity at which the precession motor is rotating the flywheel about its precession axis), and the disk velocity (i.e. the rotation speed of the flywheel disk about its axis of rotation). Sensor data 302 may also comprise data indicating the current precession axes of the gyros. Gyro state module 300 may use this information to determine the actual instantaneous magnitude and direction of the moment exerted by the gyro stabilizers vehicle, shown as gyro state data 304.

Vehicle state module 310 is shown to receive sensor data 312, which may comprise sensor data related to the vehicle's state, including its inertial state, absolute state. A vehicle's inertial state may indicate the rotational and linear acceleration, velocity, and position of the vehicle, while a vehicle's absolute state may indicate the vehicle tilt angle direction and magnitude, as well as vehicle direction of travel, speed over ground and absolute geographic position provided by sensors including an electronic compass and GPS receiver. Sensor data 312 may also comprise data indicating drive wheel speed (i.e. rotational speed of each of the drive wheels), the brake status (i.e. the rate of decrease of the vehicle drive wheel and rotational speeds), user inputs to the vehicle through the accelerator and brake, and the ordered turn radius of the vehicle through its steering unit, etc. Vehicle state module 310 produces vehicle state data 314.

Vehicle correction module 330 uses vehicle state data 314 to determine the vehicle's proper tilt angle for the current conditions and compares this to the vehicle's current tilt angle (including attitude aspects of the vehicle, such as roll movement) to determine if the vehicle is in a tilt error (i.e., an unstable state, given the current or intended state of the vehicle). Gyro control module 320 uses gyro data 304 and works in conjunction with vehicle module 330 to change the operating state of the vehicle's gyros—e.g., flywheel speeds, precession angles, and increases/decreases to the precession axes of the flywheels to produce sufficient counter-torque to stabilize the vehicle or to maintain the vehicle within a desired tilt range.

Figure 4:
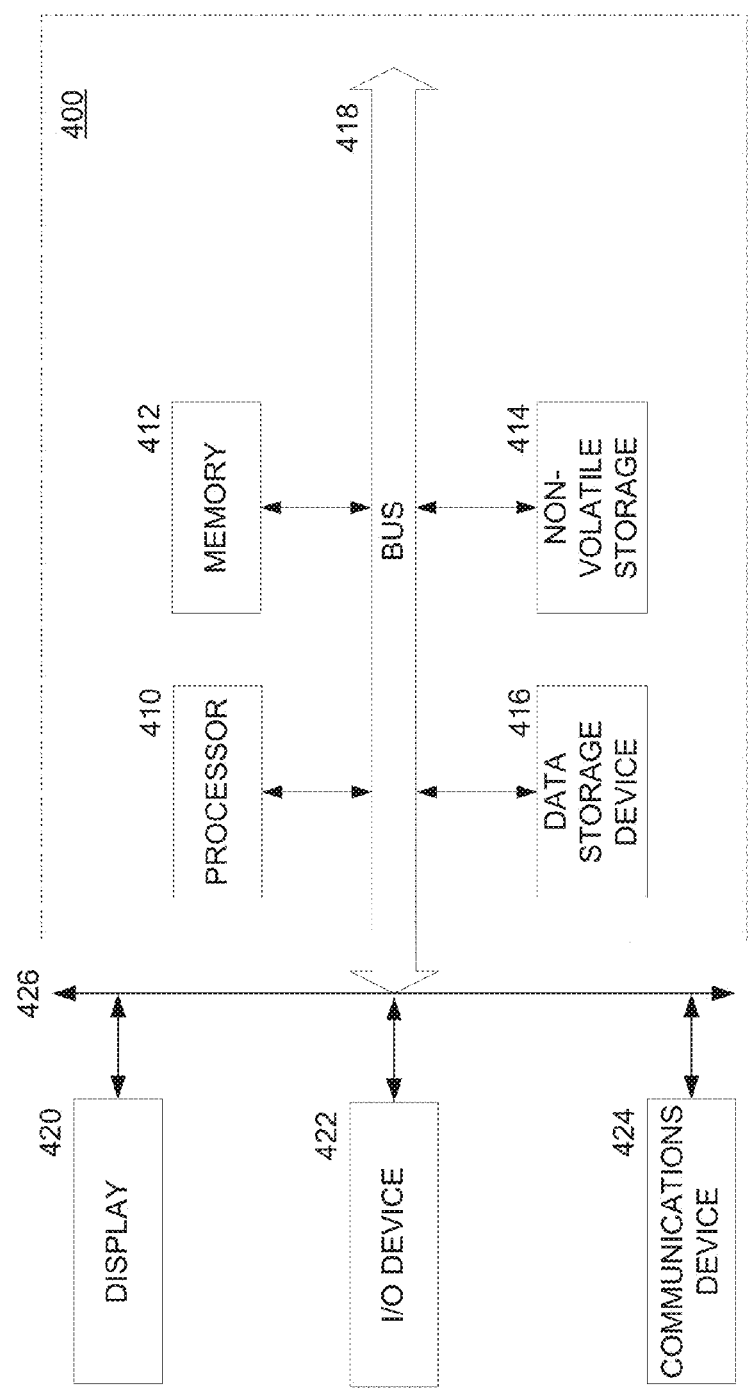
FIG. 4 is an illustration of a computing device to execute a system controller according to an embodiment of the invention.

FIG. 4 is an illustration of a computing device to execute a system controller according to an embodiment of the invention. System 400 as illustrated may be any computing device to be included in a vehicle as described herein. As illustrated, system 400 includes bus communication means 418 for communicating information, and processor 410 coupled to bus 418 for processing information. The system further comprises volatile storage memory 412 (alternatively referred to herein as main memory), coupled to bus 418 for storing information and instructions to be executed by processor 410. Main memory 412 also may be used for storing temporary variables or other intermediate information during execution of instructions by processor 710. The system also comprises static storage device 416 coupled to bus 418 for storing static information and instructions for processor 410, and data storage device 414 such as a magnetic disk or optical disk and its corresponding disk drive. Data storage device 414 is coupled to bus 418 for storing information and instructions.

The system may further be coupled to display device 420, such as a cathode ray tube (CRT) or a liquid crystal display (LCD) coupled to bus 418 through bus 426 for displaying information to a computer user. I/O device 422 may also be coupled to bus 418 through bus 426 for communicating information and command selections (e.g., alphanumeric data and/or cursor control information) to processor 410.

Another device, which may optionally be coupled to computer system 400, is a communication device 424 for accessing a network. Communication device 424 may include any of a number of commercially available networking peripheral devices such as those used for coupling to an Ethernet, token ring, Internet, or wide area network. Communication device 424 may further be a null-modem connection, or any other mechanism that provides connectivity between computer system 400 and other devices. Note that any or all of the components of this system illustrated in FIG. 4 and associated hardware may be used in various embodiments of the invention.

It will be appreciated by those of ordinary skill in the art that any configuration of the system may be used for various purposes according to the particular implementation. The control logic or software implementing embodiments of the invention can be stored in main memory 412, mass storage device 414, or other storage medium locally or remotely accessible to processor 410.

Communication device 424 may include hardware devices (e.g., wireless and/or wired connectors and communication hardware) and software components (e.g., drivers, protocol stacks) to enable system 400 to communicate with external devices. The device could be separate devices, such as other computing devices, wireless access points or base stations, as well as peripherals such as headsets, printers, or other devices.

Communication device 424 may be capable of multiple different types of connectivity—e.g., cellular connectivity and wireless connectivity. Cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity refers to wireless connectivity that is not cellular, and can include personal area networks (such as Bluetooth), local area networks (such as WiFi), and/or wide area networks (such as WiMax), or other wireless communication.

It will be apparent to those of ordinary skill in the art that the system, method, and process described herein can be implemented as software stored in main memory 412 or read only memory 416 and executed by processor 410. This control logic or software may also be resident on an article of manufacture comprising a computer readable medium having computer readable program code embodied therein and being readable the mass storage device 414 and for causing processor 410 to operate in accordance with the methods and teachings herein.

Figure 5:
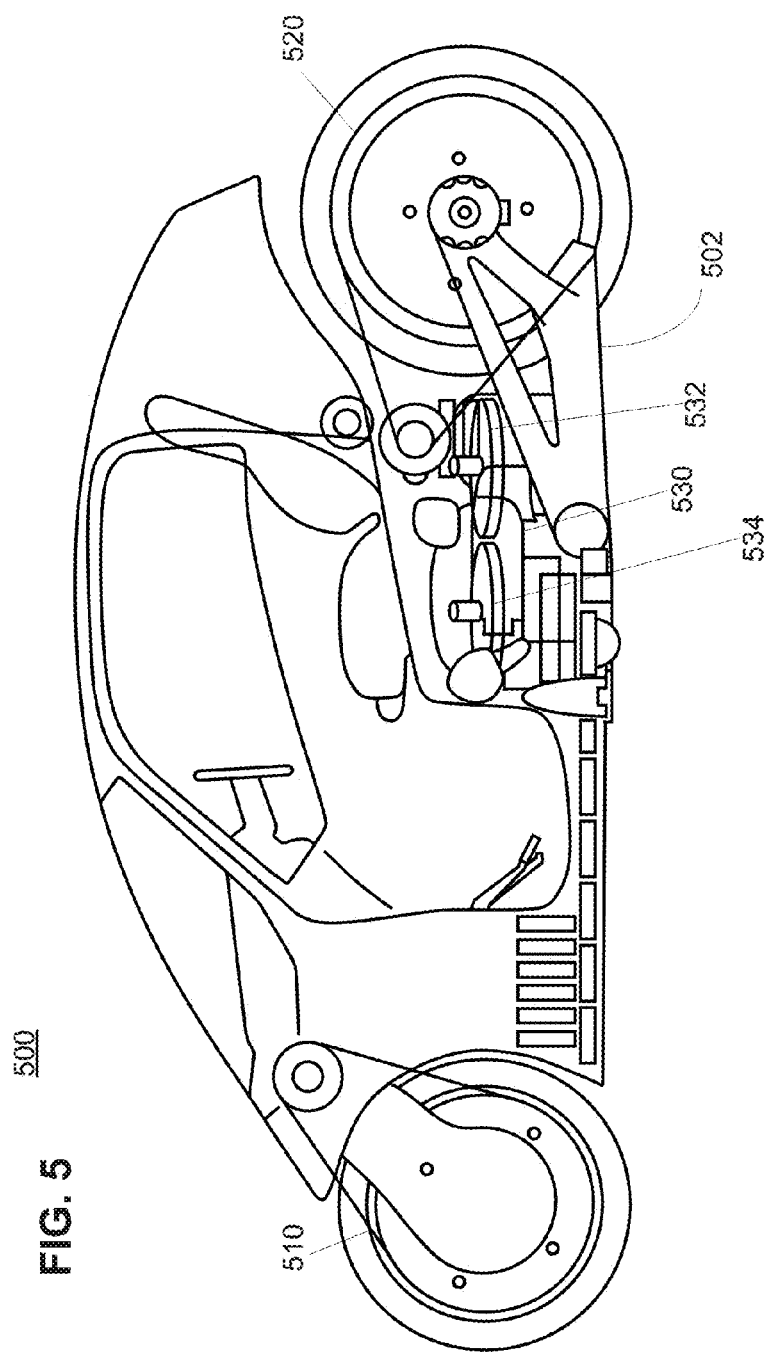
FIG. 5 illustrates an inline two-wheeled vehicle incorporating one or more embodiments of the invention.

FIG. 5 illustrates an inline two-wheeled vehicle incorporating one or more embodiments of the invention. In this embodiment, vehicle 500 comprises vehicle frame 502, and further includes first and second drive wheels 510 and 520.

In this embodiment, gyro stabilizing unit 530 is coupled to vehicle 500 through vehicle frame 502. Gyro stabilizer 530 may include first and second gyro assemblies housing flywheels 532 and 534; said flywheels may differ in size and material composition, or may be substantially identical.

Gyro stabilizer 530 may be controlled such that by utilizing more than one axis of control over each gyro's flywheel, additional levels of control of the vehicle's orientation may be achieved. One controlled degree of freedom, when lined up in a mutual orthogonal axis to the vehicles roll axis and the flywheel's rotation axis, may control the vehicle's roll. An additional degree of freedom allows for control over another axis of rotation.

In some embodiments, gyro stabilizer 530 further comprises a rotatable the turntable to increase the number of input axes the flywheels. For example, flywheels 532 and 534 are illustrated to be coupled inline to the vehicle frame (e.g., aligned lengthwise with respect to front wheel 510 and rear wheel 520). Said turntable may change the alignment of these gyroscopes, to move their alignments towards being aligned widthwise with respect to the frame of the vehicle, heightwise with respect to the frame of the vehicle, etc.

Figure 6B:
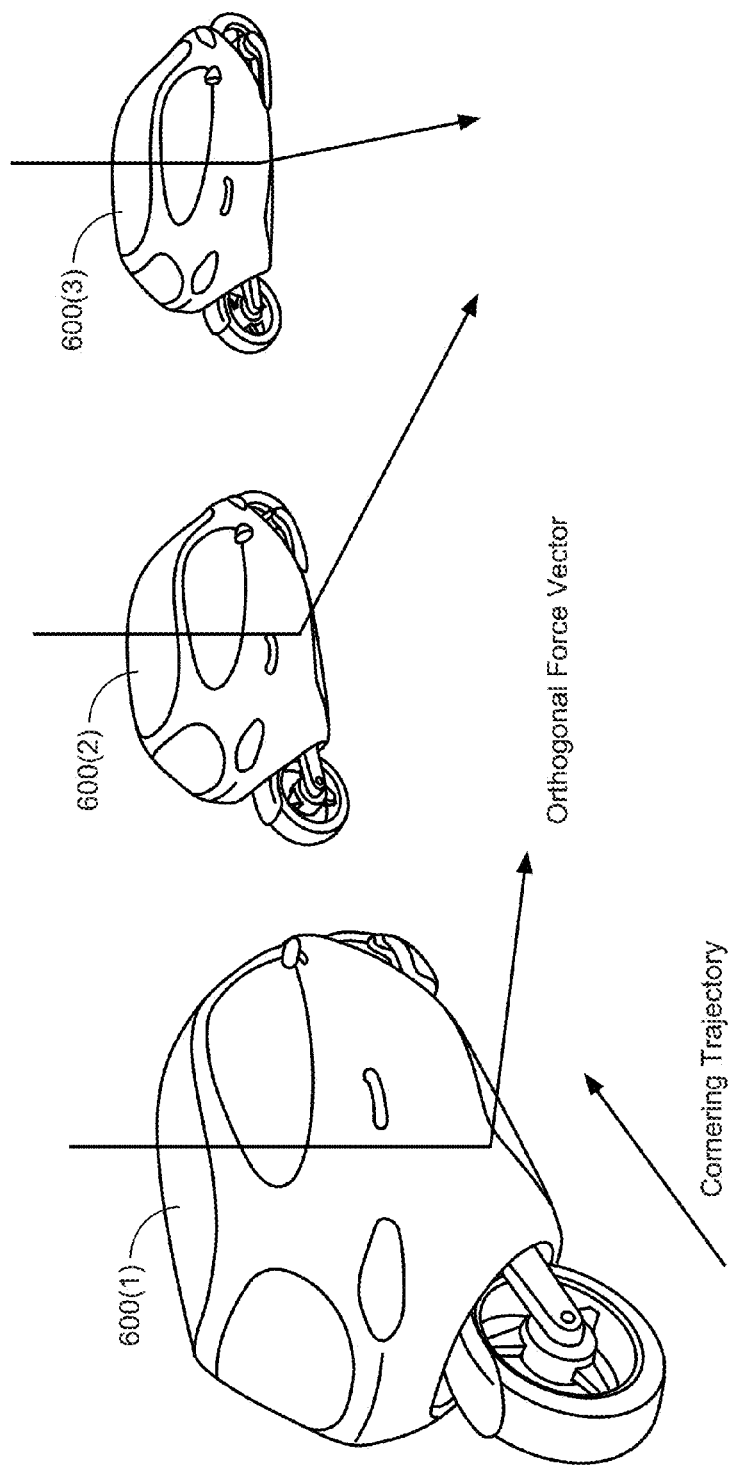

FIG. 6A-FIG. 6E illustrate a two-wheeled vehicle utilizing a control moment gyroscope unit according to an embodiment of the invention. In this embodiment, vehicle 600 is shown in FIG. 6A to comprise a two-wheeled utilizing one or more CMGs (shown as CMG 602), wherein each CMG includes a flywheel, a flywheel drive motor, a housing that has three degrees of freedom (i.e., roll, pitch, yaw), and one or more motors for actuating the housing and thereby the flywheel in roll, pitch, and yaw, each independently.

Embodiments of the invention further describe utilizing position and velocity sensors for direct closed loop control of all states of the CMGs—i.e., flywheel position, velocity and acceleration, cage attitude (i.e., roll, pitch, yaw) and all dimensions relative to body of vehicle 600. When used for the attitude control of a two or more wheeled vehicle, said attitude control may include any and all of the following: direct control of the roll, pitch, and yaw of the vehicle; stability control and external disturbance rejection, including wind and any force imparted on the vehicle from the road or other objects; stabilization in collision scenarios; attitude control in quasi-stable situations where one wheel is in poor or no contact with the ground; and attitude control when fully airborne. Of course, attitude control of a two or more wheeled vehicle may include other scenarios not described.

In some embodiments of the invention, control of the flywheel rotation may comprise: direct control of position, velocity, acceleration, or torque (e.g., open loop control of the flywheel motor, closed loop feedback control of the flywheel motor with said state sensors); direct control of the attitude (i.e., roll, pitch, yaw) of the CMG (e.g., open loop control of the attitude of the CMG, closed loop feedback control of the position, velocity, or torque input or output of the CMG).

In some embodiments, control of the flywheel rotation of one or more CMGs comprises any or all of the following: independent control of all CMGs rotation, flywheel rotation direction control such that moments generated by spinning are canceled; master-slave control such that the slave(s) mirror the motion of the master; closed loop control on a common reference flywheel position, velocity, or torque; or closed loop control on unique reference flywheel position, velocity, or torque for each flywheel.

Furthermore, embodiments of the invention may control one or more CMGs via a direct closed loop control of the resultant output force vector of all CMGs, or a direct closed loop control of the normal force on each tire via force vectoring of one or more CMG.

As described herein, direct attitude control implies explicit specification of a force vector such that the vehicle is stabilized throughout its operational range. Operation may consist of any of the following scenarios: straight highway driving; local driving at low speed with frequent stops and turns; driving in the presence of disturbances from wind and other vehicles; and cornering including low speed cornering, high speed cornering, cornering in the presence of disturbances, and cornering on steep inclines or declines. FIG. 6B illustrates direct attitude control in cornering scenarios, including an example of changes in orthogonal force vectors as vehicle 600 executes a cornering trajectory (shown as vehicle states 600(1)-600(3)).

Figure 6C:
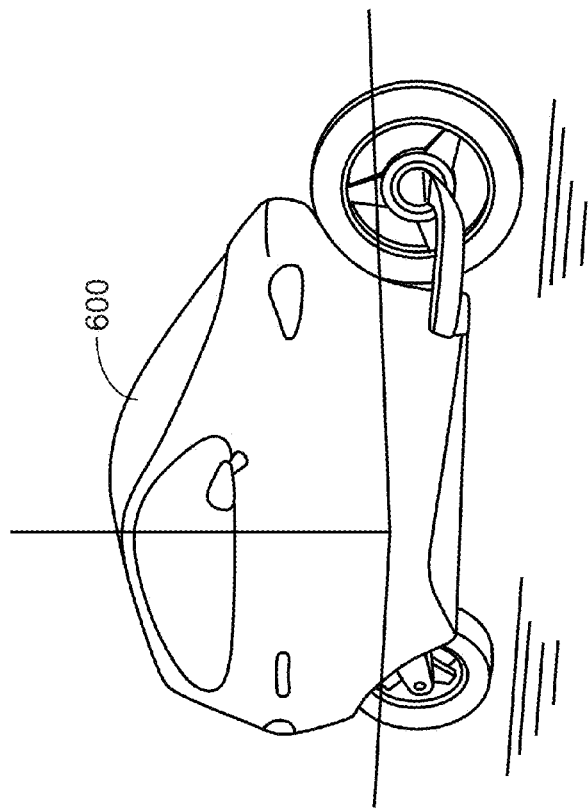
Figure 6D:
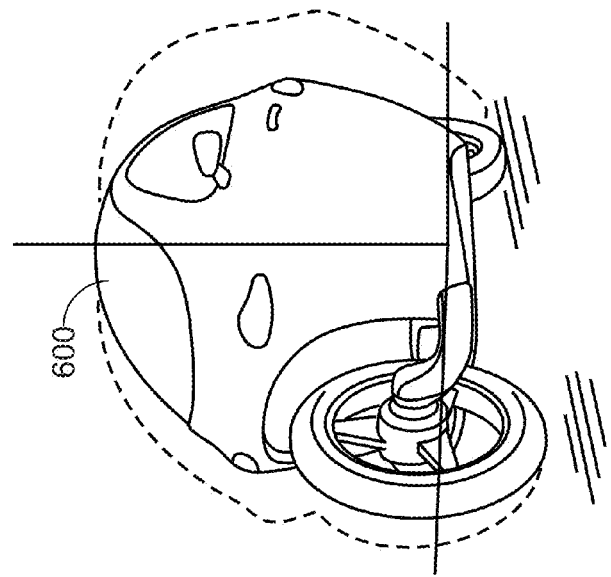

Embodiments of the invention further describe direct attitude control in quasi-stable scenarios where one or more wheels leave the ground (as shown in FIG. 6C). Operation may consist of any of the following additional scenarios: fully airborne scenarios in which all wheels leave the ground and the attitude of the vehicle are to be fully controlled for safe landing (as shown in FIG. 6D); and dynamic ground maneuvers not possible with a standard vehicle, such as low controlled burnouts and wheelies.

In addition to providing stability in standard driving scenarios as well as dynamic maneuver scenarios, the described CMGs according to embodiments of the invention may be used for the recumbent operation of statically unstable vehicles. A two wheeled motorcycle-like configuration would be difficult to operate from recumbent seated position, as in a car, without a CMG for balancing. Additionally, the CMG is necessary and useful for collision damage mitigation in scenarios involving impact with other vehicles. Last, in the case of one wheel or aerial maneuvers, the CMG is necessary to ensure the safe landing of the vehicle.

Gyroscopes are governed by the following equations of motion:

$$x=I0(-2 \sin \theta \cos \theta)+I \sin \theta(\cos \theta+); y=I0(\sin \theta+2 \cos)-I(\cos \theta+); z=I(+\cos \theta-\sin)$$

The equations of motion describe the output torque about the x, y, and z axes as a result of input euler rates, namely the rates of pitch (theta) roll (psi) and yaw (phi). The moment of inertia about the z axis (I) and about the x and y axes ($I_0$) are the physical parameters that encode the relationship between gyroscope geometry, size, and weight and output torque. In the special case of steady precession, the gyroscope moves in pitch, and results in a torque about the x-axis. All three axes can be actuated—roll, pitch, and yaw—to generate torques about all three axes simultaneously, resulting in a 3-dimensional fully specifiable force vector.

Figure 6E:
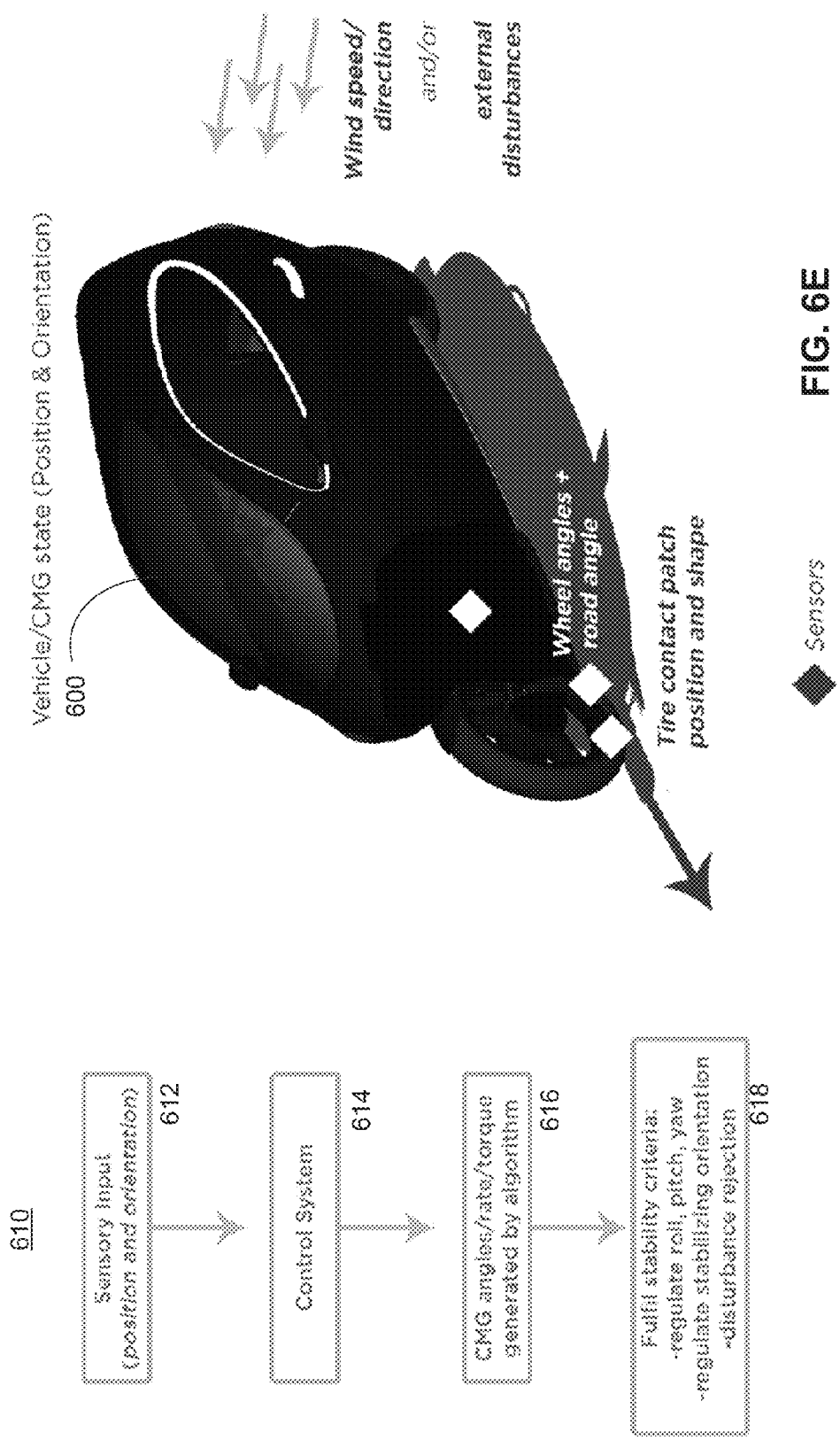

As stated above, the flywheels of a CMG is included in a cage that can actuate the assembly in roll, pitch, and yaw. Open loop control is possible, with no state information about the vehicle or CMGs utilized, as shown in FIG. 6E. With the addition of an attitude sensor on both the vehicle and the CMGs, full state feedback control is possible. The control system may operate shown in flow diagram 610: the vehicle's and gyroscope's state (position and orientation) are determined by a sensor, 612; the sensor signal is fed into a control system implemented on an onboard computer, 614; and an algorithm determines all CMG angles, rates, or torques, 616, such that a stability criteria is met, 619.

Embodiments of the invention further describe methods, apparatuses and systems for utilizing one or more gyroscopes having a dynamically balanced flywheel. Said flywheel is comprised of two mediums—a first medium comprising a solid and formed medium, and a second medium comprising a viscous (e.g., fluid) or loose particulate material to be distributed throughout the flywheel as it rotates about its spin axis.

As described below, in embodiments of the invention, flywheels such as flywheels 102/152 of FIG. 1A/FIG. 1B/may be comprised of two mediums—a first medium comprising a solid and formed medium, and a second medium comprising a fluid or loose particulate material to be distributed throughout the flywheel as it rotates about its spin axis.

Figure 7A:
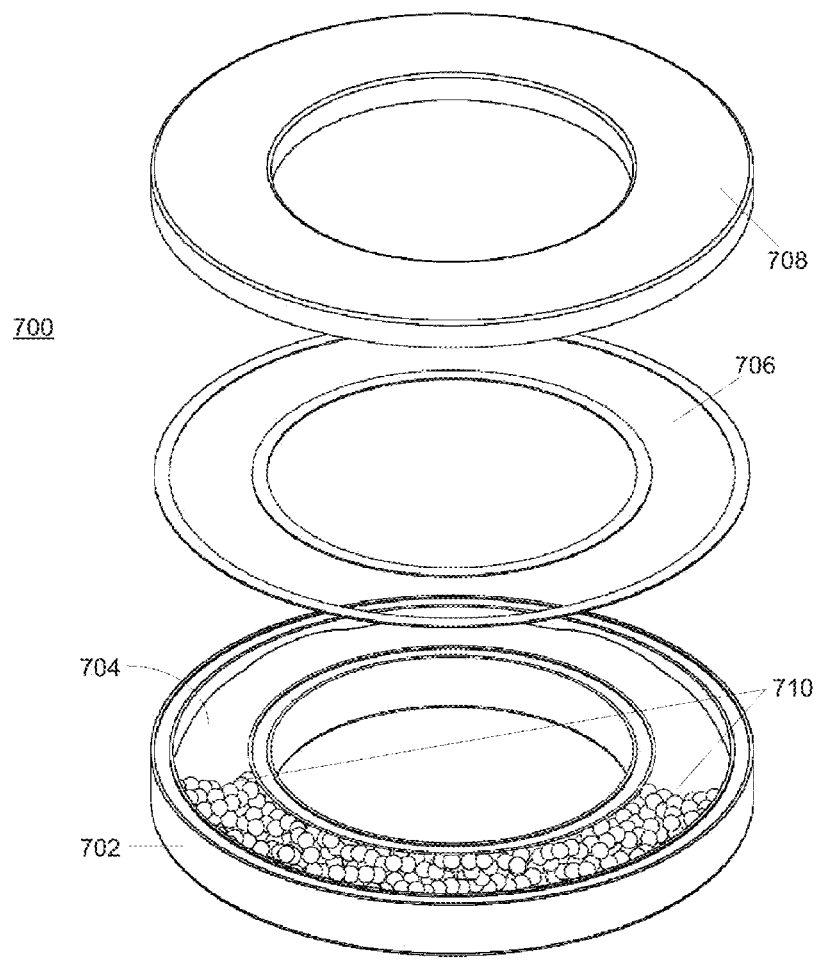
FIG. 7A-FIG. 7B illustrate a flywheel for a gyroscopic stabilization unit according to an embodiment of the invention.
Figure 7B:
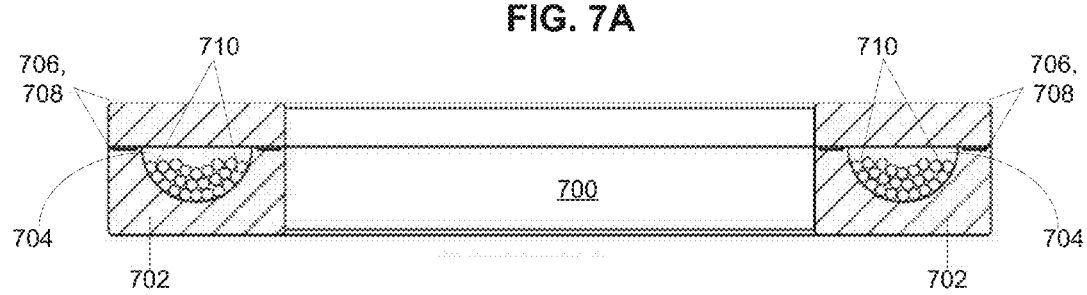

FIG. 7A-FIG. 7B illustrate a flywheel for a gyroscopic stabilization unit according to an embodiment of the invention. In this embodiment, flywheel 700 comprises body 702 formed from a solid material, such as carbon fiber, Kevlar, steel, brass, bronze, lead, depleted uranium, and any other functionally equivalent material. Within said body is a stabilizing structure illustrated as ring structure 704 at least partially filled with distributable material 710. In this embodiment, material 710 is shown to comprise a plurality of solid beads formed from similar material as body 702; in other embodiments, said material may comprise any fluid or loose particulate medium that may be distributed within flywheel 700.

In this embodiment, material 710 placed within flywheel 700 destroys, absorbs, and/or dampens vibrations during operation of the flywheel—including those caused by non-uniformities in the flywheel. Thus, in embodiments of the invention, flywheels may be machined with a greater degree of imperfections compared to those of the prior art, and can continue to function if imperfections form during subsequent operation and use.

Flywheel 700 is shown to include ring structure 704 to accept material 710. As shown in the cross-sectional view of flywheel 700 in FIG. 7B, ring structure 704 comprises a uniform structure throughout the flywheel. In other embodiments, flywheel may include a cartridge having at least one interior chamber to accept the fluid or loose particulate medium. Additionally, some embodiments may further utilize balancing weights to promote uniform spinning of the flywheel.

Flywheel 700 is shown to further utilize structures 706 and 708 to enclose ring structure 704. Thus, material in the ring structure may be added, reduced or changed. In other embodiments, the stabilizing structure of the flywheel is sealed and the material within the stabilizing structure cannot be added to, reduced, or changed.

Figure 8:
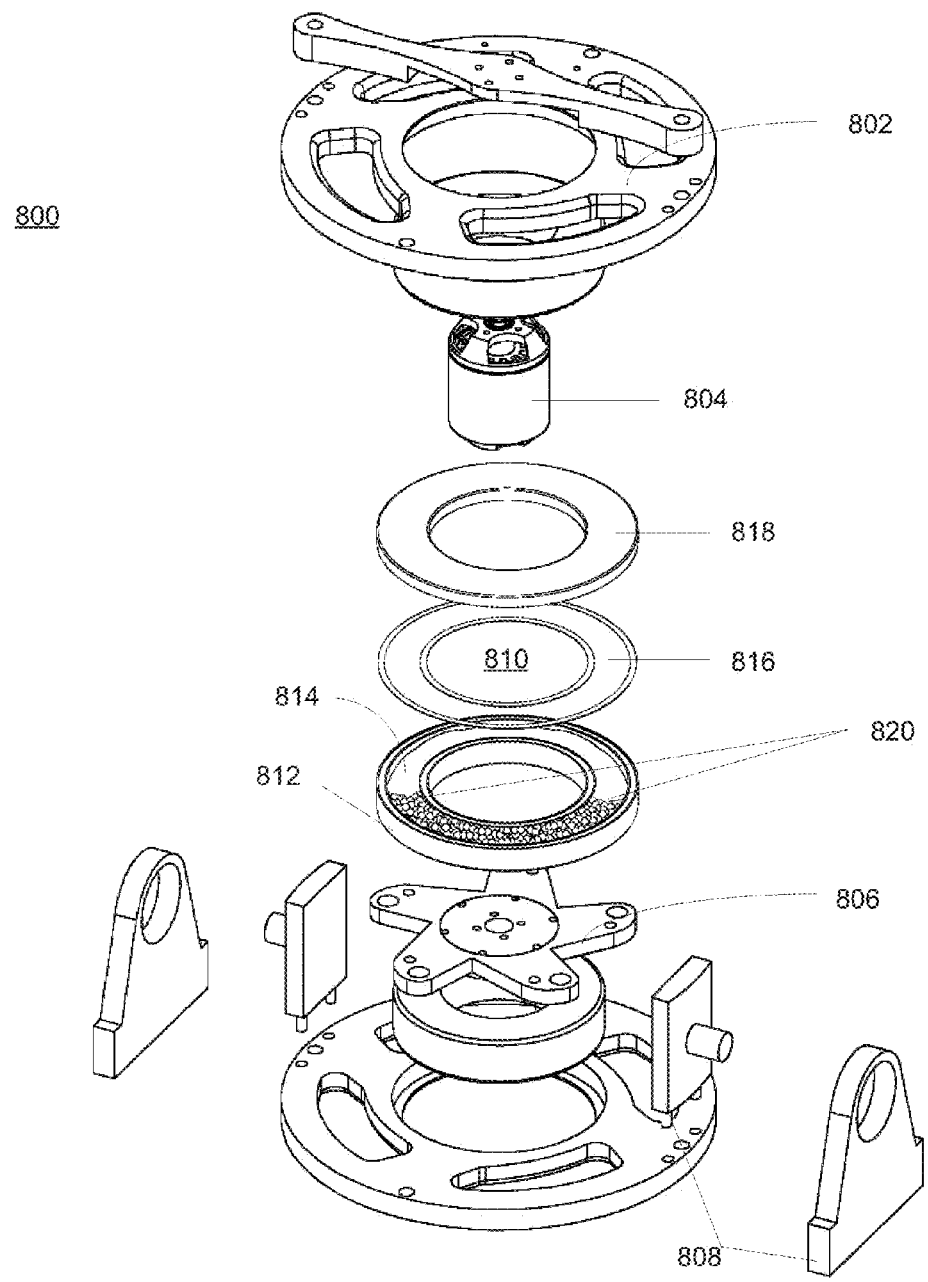
FIG. 8 illustrates a gyroscopic stabilization unit including a flywheel according to an embodiment of the invention.

FIG. 8 illustrates a gyroscopic stabilization unit including a flywheel according to an embodiment of the invention. In this embodiment, gyroscopic stabilization unit 800 is shown to include top portion 802, flywheel motor generator 804, flywheel 810, bottom portion 806, and mounting mechanism 808 for mounting the gyroscopic stabilization unit to a vehicle.

Flywheel 810 is shown to comprise body 812 formed from a solid and formed material, a stabilizing structure illustrated as ring structure 814 filled with distributable material 820, and components 816 and 818 to close said ring structure. The stabilizing structure of flywheel 810 destroys, absorbs, and/or dampens vibrations during operation of the flywheel, as described above. Furthermore, the use of said stabilization structure allows for the flywheel to generate a more precise amount of torque compared to prior art solutions.

Thus, embodiments of the invention may comprise two wheeled vehicles, such as vehicle 500 of FIG. 5, wherein gyro stabilizer 530 may include first and second gyro assemblies housing flywheels 532 and 534, and flywheels 532 and 534 may each be consistent with one of the embodiments of the invention discussed above—i.e., a flywheel comprised of a first solid and formed medium and including a stabilizing structure containing a second distributable medium (e.g., solid particulate or viscous material such as a liquid material) to be distributed throughout the structure when the flywheel rotates about the spin axis.

The basic concept of using gyroscopes to maintain a two-wheeled vehicle upright by using flywheel precession to generate counter-torque is known (while reference is made to gyro-stabilized two-wheeled vehicles in this Specification, the principles of gyro-stabilization may also be used in any vehicles which have a narrow track width such that gyro-stabilization is used to stabilize the vehicle or to augment their suspension system in providing stability); however, such systems have not become common for a variety of reasons, including the precision required for the flywheels of the gyro-stabilization unit to produce a precise and predictable amount of torque. In order for each of flywheels 432 and 434 to generate precise amounts of torque, said flywheels may each include a stabilizing structure containing a distributable medium to be distributed throughout the ring when the flywheel rotates about the spin axis. In some embodiments, the stabilizing structure comprises a ring-shaped chamber formed in the flywheel. The medium included in the stabilizing structure may comprise solid material or viscous material (e.g., liquid material or other materials that may not remain a liquid after the balance is obtained).

The basic equations governing these effects are known and described by equations. The moment of inertia (I) for a flywheel disk is given by $I=\frac{1}{4}*m*r^2$, with m being the mass of the disk and r being the radius. For a given vehicle weight and center of gravity (CG), a gyro stabilizer flywheel may be sized so that the vehicle's vertical stability may be controlled indefinitely while stopped. The radius, mass, geometry, and structure of the flywheel, including the design and implementation of the stabilization structures discussed above, may be selected to maintain both a compact size which can fit within the vehicle frame and still be able to provide an effective moment of inertia I.

Causing a flywheel to rotate will cause the distributable medium of the flywheel to be distributed evenly throughout the flywheel. Causing a rotating flywheel to precess about an axis which is normal to the flywheel axis of rotation will create a counter-torque orthogonal to both the axis of rotation and the axis of precession. The useful counter-torque $\tau$ of a gimbaled flywheel assembly is given by the equation: $\tau = I_{disk}*\omega_{disk}*\omega_{axis}$. The rotational velocity of the flywheel plays a large role in the amount of useful torque $\tau$ available to stabilize the vehicle. As one of the only controllable variables in the governing equation for a selected flywheel mass and geometry, flywheel rotational velocity can be controlled to compensate for the varying static load and load distribution of the vehicle and consequently the correctional ability of a gyro stabilizer.

Additional variables used in the control of the vehicle include:

$\theta_{Vehicle}$ is the tilt of the vehicle from side to side measured in radians $V_{Vehicle}$ is the velocity of the vehicle as it moves down the road measured in meters per second $\omega_{disk}$ is the rotational velocity of the flywheel measured in radians per second $\Phi_{axis}$ is the tilt of the flywheel from vertical, measured in radians $\omega_{axis}$ is the rotational velocity of the tilt of the flywheel, measured in radians per second $\theta_{steering}$ is the steering input, measured in radians Using inputs $\theta_{Vehicle}$, $V_{Vehicle}$, $\omega_{Flywheel}$, $\omega_{axis}$, $\phi_{axis}$, and $\theta_{Steering}$, the $\theta_{Vehicle}$ can be controlled by changing $\omega_{axis}$, which outputs a torque orthogonal to $\phi_{axis}$ so as to oppose or increase changes to $\theta_{Vehicle}$. As $\phi_{axis}$ approaches 90° or $$\frac{\pi}{2}$$

radians, the gyro's effectiveness in changing $\theta_{Vehicle}$ decreases because the torque output is orthogonal to $\phi_{axis}$. The control of $\phi_{axis}$ and $\theta_{Vehicle}$ by actuating $\omega_{axis}$ can be accomplished by using a modern control system including major and minor loop control or state space. Consequently, two outputs, $\phi_{axis}$ and $\theta_{Vehicle}$ may be accounted for at the same time with priority going to ensuring $\theta_{Vehicle}$ is stable.

Flywheel stabilization structure geometry and material (as well as precession motor sizing, which further determines the correctional ability of the gyro system) may depend on variables such as: the vehicle weight and center of gravity at anticipated load conditions, maximum vehicle speed, maximum turn rate, and anticipated environmental conditions (e.g. cross winds, variations in road gradients, & etc.). In one embodiment, the physical size and mass of the gyro assembly may be as small as possible for packaging and efficiency purposes. Embodiments of the invention may further be utilized by two wheeled vehicles substantially narrower than a traditional car or truck which therefore abides by motorcycle laws. The flywheel structure—i.e., the solid portion of the flywheel, the stabilizing structure of the flywheel, and the stabilizing medium (i.e., the distributable medium discussed above), is selected such that when rotating in the desired speed range, a single flywheel may be capable of correcting an unstable state of the overall vehicle and its contents for an extended period of time. Flywheel material selection is driven primarily by the tradeoffs between material density ($\delta$), material strength, energy storage ability and overall weight. Energy storage (E) is related to moment of inertia and velocity-squared by the equation:

$$E_{disk} = \frac{1}{2}*I_{disk}*\omega_{disk}^2.$$

Higher density material may allow for a smaller overall package, but greater flywheel mass requires larger drive motors and hence greater weight and space requirements.

Additionally, a flywheel with great mass may either be less responsive to acceleration requests (i.e., spinning up to a given speed will take longer) or may require a much larger drive motor to accelerate the flywheel within a given time. The flywheel structure—i.e., the solid portion of the flywheel, the stabilizing structure of the flywheel, and the stabilizing medium, may be optimized to increase efficiency of the vehicle, and minimizing the gyro mass helps to keep the overall vehicle mass lower, which means less energy consumption in operating the vehicle. In one embodiment, the flywheel materials are carbon fiber or Kevlar, selected for their high tensile strength for their weight, allowing higher rotation speeds (i.e. greater than 10,000 rpm) and more responsive acceleration. Higher density materials such as steel, brass, bronze, lead and depleted uranium may also be used; however it is understood that the tensile strength of these materials does not allow for higher rotational speeds which limits their usefulness in minimizing the size and mass of the flywheel.

Based on the geometry of the disc, the moment of inertia can range from $$\frac{1}{4} * m_{disk} * r_{disk}^2 \text{ to } \frac{1}{2} * m_{disk} * r_{disk}^2.$$

Because the amount of torque output by the precessing gyro is given by $\tau = I_{disk} * \omega_{disk} * \omega_{axis}$, increasing the $I_{disk}$ with the other inputs held constant means a greater $\tau$. Therefore $\tau$ may be maximized for a given size and weight constraint to keep the vehicle usable and efficient. However, $I_{disk}$ and $\omega_{disk}$ are related because as $I_{disk}$ increases, the motor spinning the gyro needs to become more powerful to achieve the desired $\omega_{disk}$ in an acceptable amount of time.

The Output Torque ($\tau$) of the gyro assembly in the X-direction also depends on the Angular Position of the gyro ($\phi_{axis}$). Output Torque ($\tau$) is maximized when the gyro's rotation is pointed vertically down or up. As the $\omega_{axis}$ increases, the gyro disc's rotation direction will move faster towards or away from vertical. If the vehicle needs to be stabilized for a longer period of time, the $\omega_{axis}$ may be minimized to maximize the amount of time that an acceptable Output Torque ($\tau$) is produced.

When the vehicle is coming to a stop and has low forward velocity (and therefore low rotation speed of the wheels), the torque in the forward direction exerted by the lean of the vehicle is described by the equation $M_x = r * f * \text{Sin}(\theta_{vehicle})$, where r is the height of the center of gravity for the vehicle, f is the force of gravity on the vehicle, and $\theta_{vehicle}$ is the amount of lean from vertical. The moment exerted by the precession of a flywheel is described by the equation $M_x = I_{disk} * \omega_{disk} * \omega_{axis} * \text{Sin}(\theta_{diskaxis})$. For a nominal 500 kg vehicle moving at low speeds, the moment exerted by a vehicle with a center of gravity 0.75 m above the ground and tipping 30 degrees from vertical is 1131 N-m. To keep the vehicle stable would therefore require 1131 N-m of counter-torque, but to move the vehicle upright, an excess of counter-torque may be required. In order to counter that tipping motion, a moment $M_x$ may need to be introduced by precessing the gyro stabilizer flywheel. If multiple flywheels are utilized, their moments are additive.

A lean of 30 degrees is more than one would deal with in real world situations not involving a failure of the stability system, so a flywheel disk approximately of 7 kg with a radius of 0.15 m and a moment inertia of 0.070 kg-m-m, spinning at 1570 rad/s, and precessing at 10.47 rad/s, with its axis vertical should exert a moment of 1295 N-m. In one embodiment, two identical flywheels are used, spinning in opposite directions and precessing in opposite directions so that the moment is exerted in the same direction, but the yaw moment $M_z$ of the two flywheels together would equal zero. The structure of the flywheels—i.e., the solid portion of the flywheel, the stabilizing structure of the flywheel, and the stabilizing medium, may be designed such that in the case of the failure of one flywheel, the remaining flywheel is able to stabilize the vehicle in most situations. Therefore, for the nominal 500 kg vehicle under the conditions described above, having a rolling moment of 1131 N-m, two flywheels would produce 2590 N-m of counter-torque which would be sufficient to maintain or correct the lean of the vehicle, and in the event of a partial failure of one flywheel the remaining flywheel could provide sufficient correctional moment to control the vehicle to place it in a safe condition. The flywheels may also be of equal size, or differing sizes.

Thus, it is to be understood that, at least in light of the above description and the figures below, embodiments of the invention describe an apparatus and methods to receive, via a plurality of sensors, data to indicate information describing a vehicle state. This information may include, but is not limited to, orientation of the vehicle frame, orientation of a front wheel of the vehicle with respect to the frame, orientation and rotational speed of gyroscope flywheels included in the vehicle (i.e., gyroscopes coupled to the vehicle frame), and the current speed of the vehicle. Said gyroscopes may be aligned lengthwise with respect to the front and rear wheel of the vehicle, widthwise with respect to the frame of the vehicle (e.g., side-by-side), or heightwise with respect to the frame of the vehicle (e.g., stacked).

Based at least in part on data received from said sensors, the orientation or the rotational speed of (at least) one of the flywheels may be adjusted. Embodiments of the invention may further adjust the orientation or the rotational speed of (at least) one of the flywheels further based on an input to change the speed (e.g., acceleration or brake input) or direction (e.g., steering wheel input) of the vehicle. For example, embodiments of the invention may cause the rotational speed of one of the flywheels to be reduced when an acceleration input is detected, or cause the rotational speed of one of the flywheels to be increased when a brake input (i.e., an input to engage a front or rear wheel brake) is detected; if it is determined the vehicle will execute a turn (i.e., the orientation of the front wheel with respect to the frame is detected), embodiments of the invention may adjust the orientation or the rotational speed of at least one of the flywheels to maintain stability during the turn.

Lower speed urban travel is generally the most energy intensive regime for traditional vehicles, due to the energy lost in frequent braking and acceleration (both from the energy input into the brakes, and the energy used to accelerate the vehicle that is lost to subsequent braking). Therefore, it is to be understood that a great leap in energy efficiency may be achieved by providing a gyro-stabilized vehicle that can travel on two-wheels, accommodate recumbent passenger arrangements, provide the safety of an all-weather enclosed passenger cabin, provide driving controls similar to a conventional car, and which can greatly improve the range and efficiency of a gyro-stabilized vehicle by integrating the stabilizing flywheels into a regenerative braking system.

At lower speeds, such as when the vehicle is accelerating from a stop or slowing to a stop, or at speeds common in urban areas and stop-and-go traffic situations, the self stabilization properties of the vehicle are not sufficient to maintain the upright orientation of the vehicle. Consequently, in the prior art much more skill is required from the rider to operate the unstabilized vehicle, and the rider may be required to use his or her own physical strength to balance the vehicle at a stop diminishing the utility and equal accessibility.

Gyro-stabilization at low speeds and at stop also presents a simpler control problem than that encountered at higher speeds. A gyro stabilizer may be mounted to a vehicle through gimbal mountings, utilizing the gimbal motors to precess the gyros to create counter-torque against vehicle roll moment. Vehicle state can be measured by inertial and absolute position sensors mounted to the vehicle which can then be used to determine the amount and rate of precession required to provide sufficient counter-torque to maintain the vehicle upright. Generally, the restorative ability of the gyro stabilizer may be able to stabilize a vehicle with a passenger for a sufficient amount of time such as may be encountered at a stop light or stop sign. In one embodiment, when the vehicle is stopped for prolonged periods or turned off, the vehicle may support itself by an automatically deployed mechanical support.

In one embodiment, the gyro stabilizer flywheel(s) and drive wheel(s) are coupled to their own respective motor-generator(s) which can operate in a motor-mode to drive their respective loads, or switch to a generator-mode to slow the rotating loads and harvest this energy for transfer to other loads. The electrical power system includes an energy storage unit to provide temporary storage of electrical energy while transferring it between the drive/braking system and the gyro stabilizer flywheels or for longer durations of time such as when the vehicle is powered off.

A system controller receives sensor data from the vehicle's state sensors (inertial and absolute), the gyro stabilizer's state sensors, and other parameters to control the amount and timing of correctional torque imparted by the gyro stabilizer.

A gyro stabilizer includes at least one actively gimbaled flywheel coupled to a vehicle. In one embodiment, a gyro stabilizer includes first and second counter-rotating flywheels which are independently gimbaled. Each flywheel may be mounted with a vertical axis of rotation in a neutral position and with the gimbal axes parallel to each other. In this embodiment, the counter-rotating flywheels are precessed in opposite directions, such that their counter-torque is additive, but their yaw effects on the vehicle cancel each other.

Use of two flywheels also allows each individual flywheel to be made more compact in order to fit within the narrow frame of the vehicle. Additionally, in the event one flywheel fails, the second flywheel can be used to provide adequate stability during an emergency stop of the vehicle to place it in a safe condition. In the case of either flywheel failure or emergency balance situation, a failsafe protocol engaging the deployment to the mechanical landing gear may be used to keep the vehicle upright and maintain the driver's safety.

In some embodiments, said stability criteria may include any/all of the following: regulation about a specific vehicle orientation (i.e., roll, pitch, yaw); regulation about a stabilizing orientation, where the stabilizing orientations are determined by other sensory input, such as wheel angles, wind speed and direction, the angle under each tire, contact patch position and shape, and any other piece of information that is part of the state of the vehicle or state of the surrounding environment; disturbance rejection, where disturbances may include environmental forces such as wind or other vehicles, or internal disturbances, such as driver position and motion.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. A gyroscope apparatus comprising:
   a flywheel housing including one or more gimbals, and a spin axis; and
   a flywheel comprising a first medium and included in the housing to rotate about the spin axis and to be precessed via the one or more gimbals, the first medium to comprise a solid and formed medium, the flywheel to include:
      a stabilizing structure including a second distributable medium to be distributed throughout the stabilizing structure when the flywheel rotates about its spin axis, the second medium to comprise one of a fluid medium and a loose particulate medium.

2. The gyroscope apparatus of claim 1, wherein the stabilizing structure of the flywheel comprises a ring-shaped chamber formed in the flywheel.

3. The gyroscope apparatus of claim 1, wherein the stabilizing structure of the flywheel comprises a chamber formed in a section of the flywheel, and the second distributable medium is included in a cartridge placed in the chamber.

4. The gyroscope of claim 1, wherein the loose particulate medium of the flywheel comprises an aggregate amount of loose particulate material.

5. The gyroscope of claim 1, wherein the fluid medium of the flywheel comprises a viscous material.

6. The gyroscope of claim 1, wherein the first medium of the flywheel comprises at least one of carbon fiber, Kevlar, steel, brass, bronze, lead or depleted uranium.

7. The gyroscope of claim 1, wherein the stabilizing structure of the flywheel includes a removable top to allow for adding, reducing, or changing the second distributable medium.

8. The gyroscope of claim 1, wherein the stabilizing structure of the flywheel comprises a sealed structure enclosed in the flywheel.

9. A vehicle comprising:
   a frame;
   a front wheel and a rear wheel coupled to the frame;
   a gyroscope coupled to the frame, the gyroscope comprising:
      a flywheel housing including one or more gimbals, and a spin axis; and
      a flywheel comprising a first medium and included in the housing to rotate about the spin axis and to be precessed via the one or more gimbals, the first medium to comprise a solid and formed medium, the flywheel to include:
         a stabilizing structure including a second distributable medium to be distributed throughout the stabilizing structure when the flywheel rotates about its spin axis, the second distributable medium to comprise one of a fluid medium or loose particulate medium;
   a plurality of sensors to detect orientation of the frame, orientation of the front wheel with respect to the frame, orientation and rotational speed of the flywheel, and speed of the vehicle; and
   an electronic control system to adjust at least one of the orientation and rotational speed of the flywheel based, at least in part, on data from the plurality of sensors and an input to change at least one of speed and direction of the vehicle.

10. The vehicle of claim 9, wherein the stabilizing structure of the flywheel of the gyroscope comprises a ring-shaped chamber formed in the flywheel.

11. The vehicle of claim 9, wherein the stabilizing structure of the flywheel of the gyroscope comprises a chamber formed in a section of the flywheel, and the second medium is included in a cartridge placed in the chamber.

12. The vehicle of claim 9, wherein the second medium of the flywheel of the gyroscope comprises an aggregate amount of loose particulate material.

13. The vehicle of claim 9, wherein the fluid medium of the flywheel of the gyroscope comprises a viscous material.

14. The vehicle of claim 9, wherein the first medium of the flywheel of the gyroscope comprises at least one of carbon fiber, Kevlar, steel, brass, bronze, lead or depleted uranium.

15. The vehicle of claim 9, wherein the stabilizing structure of the flywheel of the gyroscope includes a removable top to allow for adding, reducing, or changing the second distributable medium.

16. The vehicle of claim 9, wherein the stabilizing structure of the flywheel comprises a sealed structure enclosed in the flywheel.

* * * * *